R. L. DIAMOND.
MOTOR VEHICLE.
APPLICATION FILED NOV. 2, 1914.
1,167,549.
Patented Jan. 11, 1916.
2 SHEETS—SHEET 1.
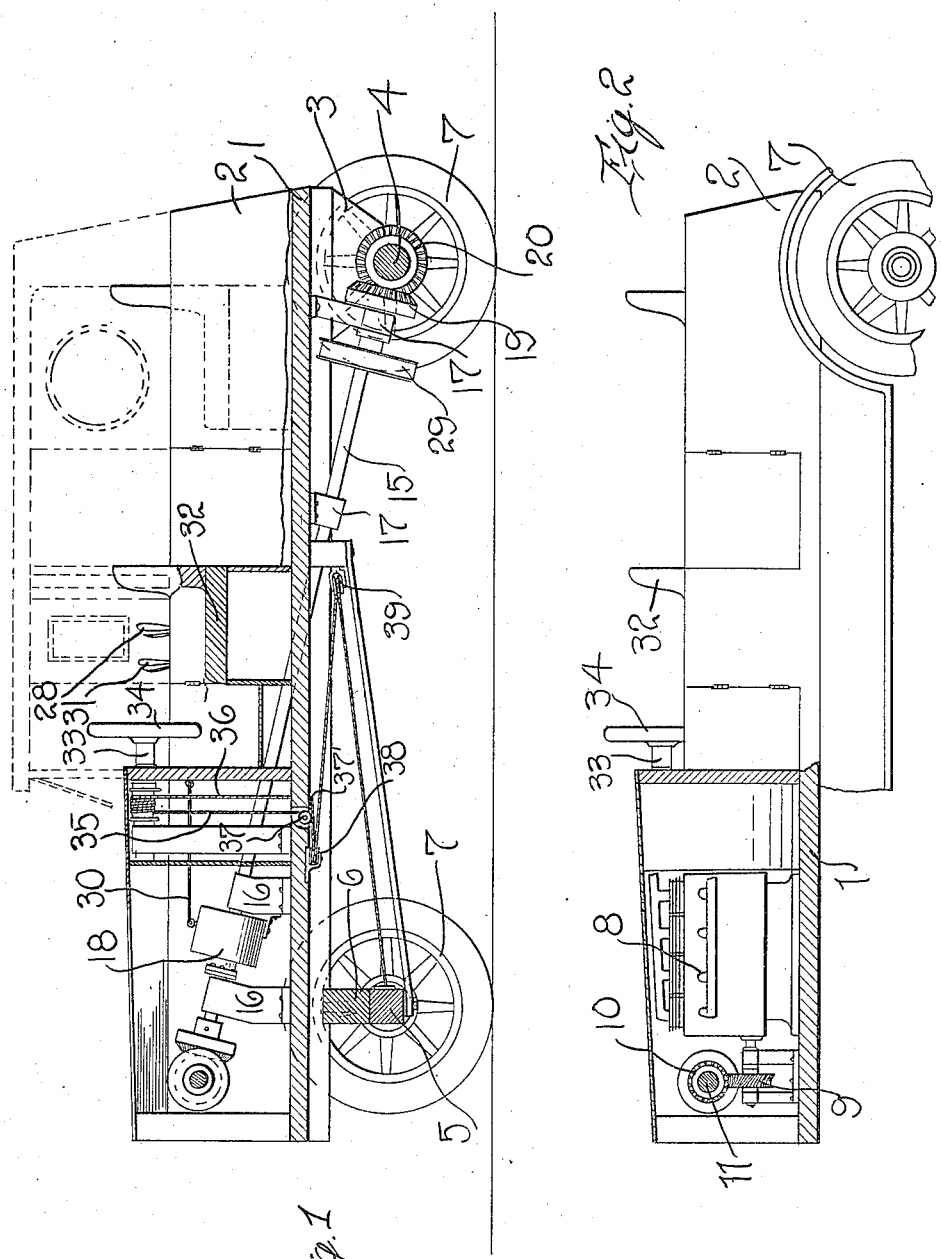
Witnesses
Robert M. Sutphen
V. J. Nowrick
Inventor
R. L. DIAMOND
By Watson E. Coleman
Attorney R. L. DIAMOND.
MOTOR VEHICLE.
APPLICATION FILED NOV. 2, 1914.
1,167,549.
Patented Jan. 11, 1916.
2 SHEETS—SHEET 2.
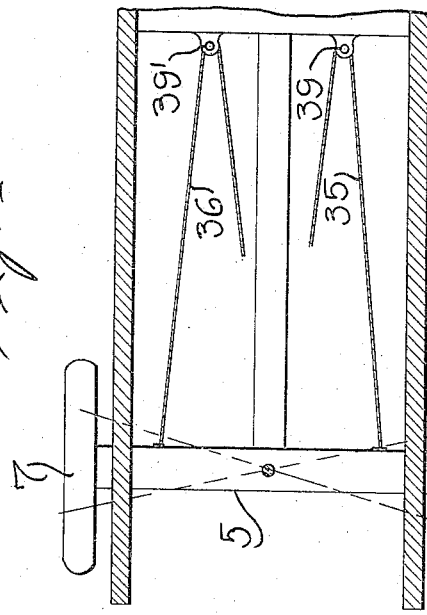
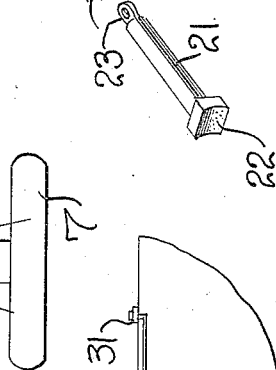
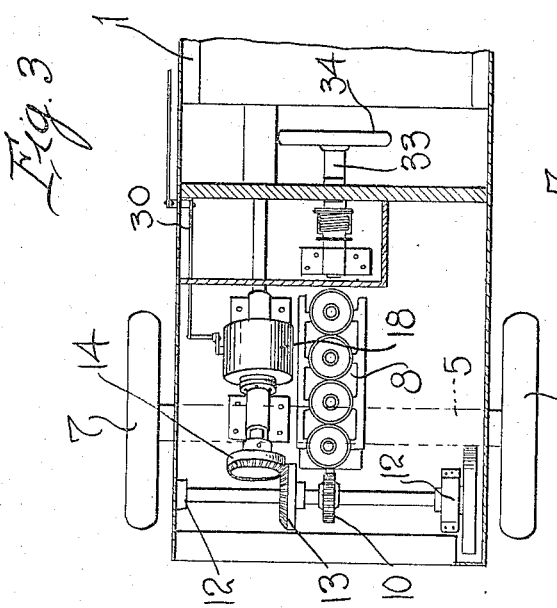
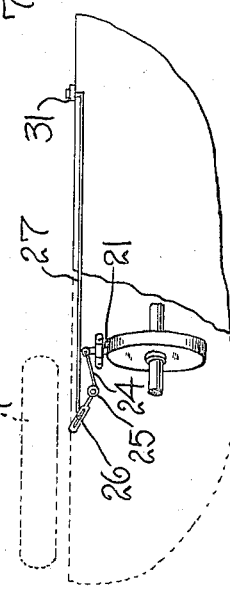
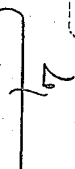
Witnesses
Robert M. Sutphen
V. J. Howrick
Inventor
R. L. DIAMOND
By Watson E. Coleman
Attorney

UNITED STATES PATENT OFFICE.

RUBIN L. DIAMOND, OF VESTRY, MISSISSIPPI, ASSIGNOR OF ONE-HALF TO DAVID L. WALKER, OF CLARENCE, MISSISSIPPI.

MOTOR-VEHICLE.

1,167,549.  Specification of Letters Patent.  Patented Jan. 11, 1916.

Application filed November 2, 1914. Serial No. 869,918.

*To all whom it may concern:*

Be it known that I, RUBIN L. DIAMOND, a citizen of the United States, residing at Vestry, in the county of Jackson and State of Mississippi, have invented certain new and useful Improvements in Motor-Vehicles, of which the following is a specification, reference being had to the accompanying drawings.

This invention relates to new and useful improvements in motor vehicles and more particularly to a driving mechanism therefor, the main object of the present invention being the provision of a motor vehicle wherein positive driving connection is arranged between the engine and the driving axle.

Another object of the present invention is the provision of a motor vehicle which includes an engine, a transverse jack shaft arranged at the forward end of the vehicle and connected with the engine and a longitudinal drive shaft, the forward end of which connects with the jack shaft, while the other end thereof projects rearwardly upon an incline with the vehicle and connects with the rear driving axle.

An additional object is to provide a novel form of brake which consists of a brake drum keyed on the drive shaft and a braking shoe which is slidably attached to the frame of the vehicle and is projected into engagement with the periphery of the braking drum by means of a hand lever for control from the driver's seat.

A further object of the present invention is the provision of a motor vehicle of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a longitudinal sectional view of a motor vehicle constructed in accordance with my invention. Fig. 2 is a side elevation, parts thereof being broken away and illustrated in section. Fig. 3 is a horizontal sectional view. Fig. 4 is a detail horizontal sectional view, illustrating the location of the steering rods. Fig. 5 is a detail bottom plan view illustrating the manner of mounting the brake mechanism; and Fig. 6 is a detail perspective view of the brake shoe and rod connected thereto.

Referring more particularly to the drawings, 1 indicates the frame of my improved motor vehicle which is generally known as the chassis, upon which the body 2 is mounted. The chassis 1 is supported by suitable brackets 3, having arranged therein the rear axle 4 and the forward axle 5. The forward axle 5 is arranged beneath a bolster 6, which supports the forward end of the frame 1, upon the axle 5. The axles 4 and 5 are provided at opposite ends thereof with the supporting wheels 7.

Mounted upon the frame and arranged directly above the forward bolster 6, is the engine 8 which is preferably of the well known gasolene type and is connected to the crank shaft of the engine, by a gear 9 adapted to mesh with a similar gear 10 which is mounted upon jack shaft 11. This shaft 11 extends transversely across the forward end of the frame and is mounted within suitable bearings 12. Mounted upon the shaft 11, at a point adjacent the gear 10, is a bevel gear 13 which is adapted to mesh with a similar gear 14 secured to the upper end of the inclined drive shaft 15. The shaft 15 is supported at its forward end by means of the bearings 16, while the rear end thereof, which is inclined downwardly below the forward end, is supported in the bearings 17.

Mounted upon the shaft 15 and disposed between the bearings 16, on a casing or housing 18, is the transmission which may be either planetary or selective, as desired. The usual reversing mechanism is also contained within the casing 18, whereby the vehicle may be driven either forwardly or rearwardly. Secured to the lower or rear end of the shaft 15, is a bevel gear 19 adapted to mesh with a similar gear 20 mounted upon the rear axle 4. From this it will be apparent that power will be transmitted from the engine 8 to the rear or drive axle 4.

In order to retard or brake the rotary movement of the shaft 15, I provide a movable bar 21, having secured to its inner end a brake shoe 22. The other end of said bar being provided with a perforated ear 23 whereby the same is movably secured to the arm 24 of the bell crank 25. The other arm of said bell crank being provided with an elongated slot and movable therein is a bolt 26, which is carried by the actuating rod 27. The rod 27 extends forwardly to a suitable lever 28, whereby upon the actuation of said lever, the brake shoe 22 may be readily applied to the periphery of the brake wheel 29. The periphery of said brake wheel 29 is provided with spaced flanges forming a guide for the shoe 22 to prevent lateral movement of the same. In operating the transmission gears (both forward and reverse) which are, as stated, contained within the housing 18, I employ a rod 30 which is connected with the lever 31, said lever being arranged adjacent the lever 28, which actuates the brake mechanism. These two levers 28 and 31 are arranged adjacent the forward seat 32, so that they may be readily accessible to the driver.

The steering mechanism of my improved motor vehicle includes a longitudinal shaft 33 mounted directly in front of the forward seat 32 and having upon its inner end a hand wheel 34 adapted to be grasped by the driver to rotate the shaft 33. Wound upon the shaft 33 in opposite directions, are the wire ropes 35 and 36. The rope 35 extends downwardly around the pulley 37; thence forwardly around a second pulley 38, thence rearwardly and around a third pulley 39, suspended beneath the central portion of the vehicle. The rope then extends forwardly and is secured adjacent one end of the forward axle 5. The rope 36, extends downwardly around a pulley 37'; thence forwardly around a second pulley 38 and thence rearwardly around a third pulley 39'. The rope 36 then extends forwardly again and is secured to the end of the axle opposite the rope 35. From this it will be apparent that upon rotation of the shaft 33, the forward axle 5 may be swung in either direction.

I claim—

1. In a motor vehicle, a source of power mounted within the hood, a drive shaft operatively connected at its rear end to the rear axle and projecting at its forward end into the hood, in transversely spaced relation to the crank shaft of the source of power, and a transversely disposed jack shaft operatively connecting the drive shaft and the crank shaft with the source of power.

2. In a motor vehicle, an engine disposed within the hood, with its crank shaft longitudinally related to the vehicle, a drive shaft operatively connected at its rear end to the rear axle of the vehicle and projecting at its forward end into the hood and in transversely spaced relation to the crank shaft of the engine, a transverse jack shaft operatively connecting the crank shaft and drive shaft, a transmission interposed in the drive shaft and disposed within the hood of the vehicle, and means for adjusting the transmission.

3. In a motor vehicle, an engine disposed within the hood, with its crank shaft longitudinally related to the vehicle, a drive shaft operatively connected at its rear end to the rear axle of the vehicle and projecting at its forward end into the hood and in spaced relation to the crank shaft of the engine, a transverse jack shaft operatively connecting the crank shaft and drive shaft, said jack shaft being disposed in advance of the engine, a transmission interposed in the drive shaft and disposed within the hood of the vehicle, and means for adjusting the transmission.

4. In a motor vehicle, an engine disposed within the hood of the vehicle, a drive shaft operatively connected at its rear end to the rear axle and projecting at its forward end into the hood, in spaced relation to the crank shaft of the engine, the vertical plane of the drive shaft being parallel to the vertical plane of the crank shaft and means located in the hood operatively connecting the drive shaft and the crank shaft.

In testimony whereof I hereunto affix my signature in the presence of two witnesses.

his
RUBIN L. × DIAMOND.
                mark

Witnesses:
  R. M. SMITH,
  R. A. SMITH.

Copies of this patent may be obtained for five cents each, by addressing the "Commissioner of Patents, Washington, D. C."